United States Patent [19]

Dudley et al.

[11] 4,186,097

[45] Jan. 29, 1980

[54] SHIFTABLE BOTTOM WALL FOR SEPARATOR BOWL AND WEAR SHOE THEREFOR

[75] Inventors: Robert H. Dudley; Frank C. Halisek, both of Portage, Mich.

[73] Assignee: Reclamet, Inc., Kalamazoo, Mich.

[21] Appl. No.: 955,579

[22] Filed: Oct. 30, 1978

[51] Int. Cl.[2] .......... B01D 33/10

[52] U.S. Cl. .......... 210/377; 210/380 R; 233/3; 241/282.2

[58] Field of Search .......... 210/373-375, 210/380-382, 370, 377, 360 R, 298; 233/3, 47 R; 241/282.1, 282.2

[56] References Cited

U.S. PATENT DOCUMENTS

| | | | |
|---|---|---|---|
| 1,520,467 | 12/1924 | Frantz | 210/377 |
| 3,216,042 | 11/1965 | Strittmatter | 210/375 |
| 3,483,991 | 12/1969 | Humphrey | 210/377 |
| 4,137,176 | 1/1979 | Dudley et al. | 210/375 |

*Primary Examiner*—William A. Cuchlinski, Jr.
*Assistant Examiner*—Jon E. Hokanson
*Attorney, Agent, or Firm*—Blanchard, Flynn, Thiel, Boutell & Tanis

[57] ABSTRACT

A centrifuge for continuously separating a lubricating liquid from lubrication-impregnated metal chips. A motor having a drive shaft thereon is mounted so that the drive shaft is drivingly coupled to a substantially bell-shaped centrifugal separator bowl having a bottom wall and an outwardly widening conical portion. The separator bowl is formed with openings intermediate the top edge and bottom wall for discharge of the liquid therethrough. A plurality of blades may be mounted on the separator bowl adjacent the top edge and are movable therewith for effecting a movement of air into an annular collecting structure from the air inlet and out through the outlet duct to effect an entrainment of the metal chips in the air movement for discharge out through the outlet duct. The bottom wall of the separator bowl has a bottom wall liner with a plurality of radially extending blades thereon on top thereof. The bottom wall liner is fixedly maintained relative to the conical wall structure but is angularly shiftable relative thereto either manually or in response to the blades engaging extraordinarily large pieces of metal, such as rod ends or the like.

3 Claims, 8 Drawing Figures

FIG. 4
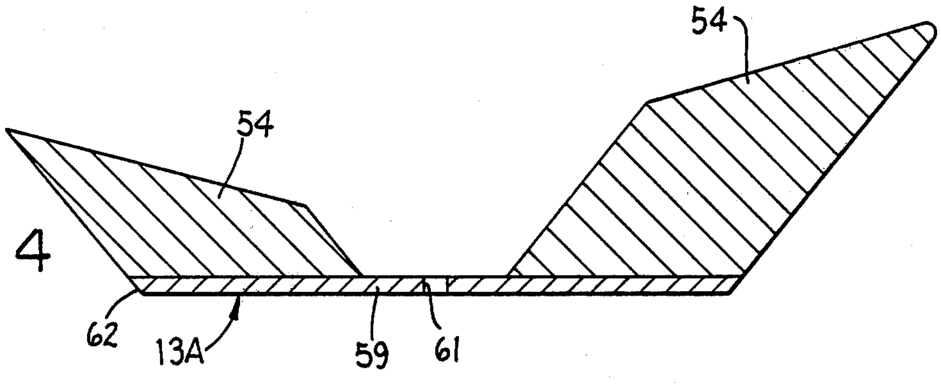
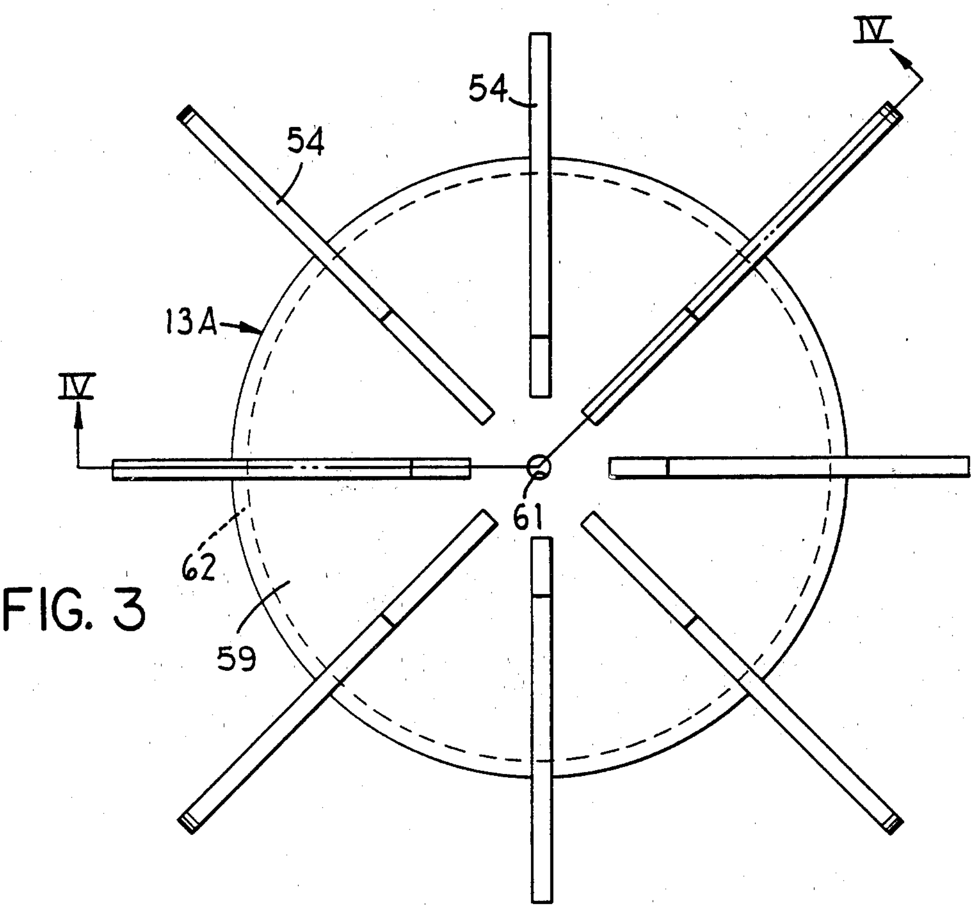
FIG. 3

FIG. 5
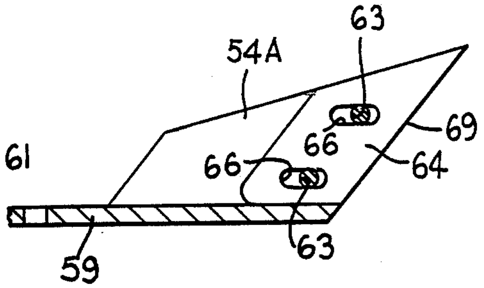
FIG. 6
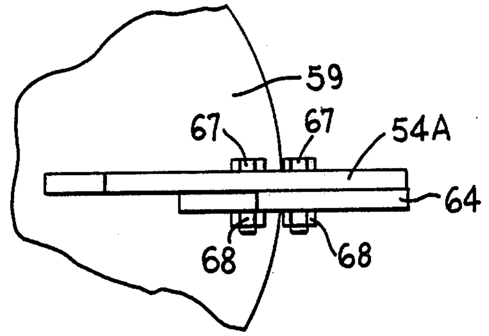
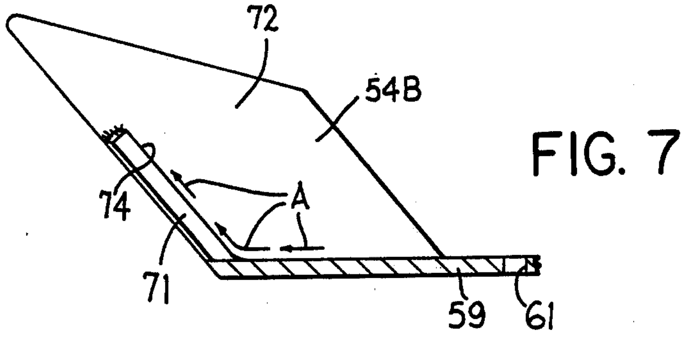
FIG. 7
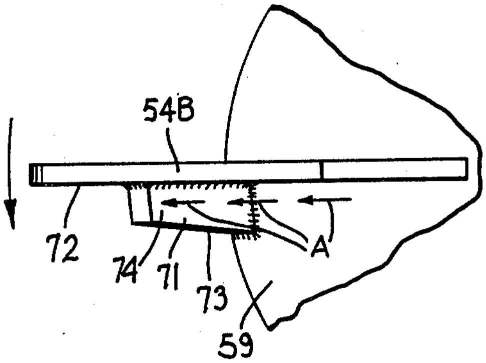
FIG. 8

SHIFTABLE BOTTOM WALL FOR SEPARATOR BOWL AND WEAR SHOE THEREFOR

FIELD OF THE INVENTION

This invention relates to a centrifuge and, more particularly, to a centrifuge for continuously separating a lubricating liquid from lubrication-impregnated metal chips and including a bottom wall liner for the bottom wall of the separator bowl for minimizing wear on at least the outward conical wall of the separator bowl.

BACKGROUND OF THE INVENTION

Centrifuges for continuously feeding and removing liquid from lubrication-impregnated metal chips of shavings are well known in the art and the teachings in Hultsch et al U.S. Pat. No. 3,233,735, Steimel U.S. Pat. No. 3,366,318 and Dudley U.S. Pat. No. 3,850,814 are representative teachings of such structures. Another teaching of a centrifuge is embodied in U.S. Pat. No. 4,137,176, filed Oct. 11, 1977. In that disclosure, a plurality of blades are provided in the bottom of the separator bowl. The blades are formed as part of a bowl liner which lines the bottom wall of the separator bowl, as well as the internal wall thereof. The liner protects the internal wall surface of the separator bowl against wear. It has been noted that when blades are provided in the bottom of the separator bowl, the leading surface of the blades collects metal shavings as the bowl is rotated and centrifugal force throws the metal shavings radially outwardly into engagement with the internal wall surface of the separator bowl. Repeated movement of the metal shavings along the radially outermost portion of the blades along the internal wall surface of the separator bowl results in wear on the internal wall surface of the separator bowl at the juncture between the blades and the internal wall surface of the separator bowl. The disclosure in the aforementioned U.S. Pat. No. 4,137,176 minimizes this wear pattern by lining the separator bowl with a liner which has a plurality of blades fixedly disposed thereon.

While the solution to the wear problem is generally satisfactory in the aforementioned U.S. Pat. No. 4,137,176, the replacement of the liner after it becomes worn along a path at the juncture between the radially outermost portion of the blades and the internal wall surface of the liner is a cumbersome and time-consuming process. Therefore, it is highly desirable that wear on the separator bowl itself be minimized without necessitating time-consuming replacements of the entire separator bowl or liners for the separator bowl.

It is an object of this invention to minimize wear on the internal surface of the separator bowl by providing a plurality of blades in the bottom of a separator bowl which are movable relative to the separator bowl so that the path of movement of the metal shavings along the internal wall surface of the separator bowl is continually changed to present a new and unworn portion of the internal wall surface to the movement of metal shavings thereover.

It is a further object of this invention to provide structure for mounting the blades in the bottom of the separator bowl, which structure will effect an automatic movement of the blades relative to the internal wall surface of the separator bowl in response to the blades engaging extraordinarily large objects in the metal shavings, such as rod ends, workmen's tools and the like, which, from time to time, become embodied within the metal shavings.

It is a further object of this invention to provide structure for supporting the blades for relative movement in the separator bowl, which structure can be manually engaged to move the blades relative to the internal wall surface of the separator bowl to expose an unworn segment of internal wall surface to metal shavings passing thereover along a path adjacent the leading side and radially outermost portion of the blades and the internal wall surface of the separator bowl.

It is a further object of this invention to provide a blade support structure, as aforesaid, which can be readily included in existing equipment at a minimum of expense.

SUMMARY OF THE INVENTION

In general, the object and purposes of the invention are met by providing a motor having a rotatable drive shaft drivingly connected to a centrifuge separator bowl. The separator bowl is formed to have openings to facilitate the discharge of liquid therethrough under the action of centrifugal force. A plurality of angularly spaced blade means are provided in the bottom of the separator bowl with support means being included for supporting the blade means for movement relative to the separator bowl so that wear on the internal wall of the separator bowl, caused by the movement of the metal shavings along a path located at the juncture between the leading side of the blade means and the separator bowl, will be minimized due to the relative movement and a relocating of the path on an unworn section of the internal wall to thereby enhance the lifetime of the separator bowl.

BRIEF DESCRIPTION OF THE DRAWINGS

Further objects and purposes of this invention will be apparent to persons acquainted with apparatus of this general type upon reading the following specification and inspecting the accompanying drawings, in which:

FIG. 3 is a top view of the bottom wall liner;

FIG. 4 is a sectional view taken along the line IV—IV of FIG. 3;

FIG. 5 is a fragmentary view of a modified blade structure on the bottom wall liner;

FIG. 6 is a top view of the modified blade structure of FIG. 5;

FIG. 7 is a fragmentary view of a further modified blade structure of the bottom wall liner; and FIG. 8 is a top view of the blade structure of FIG. 7.

Figure 1:
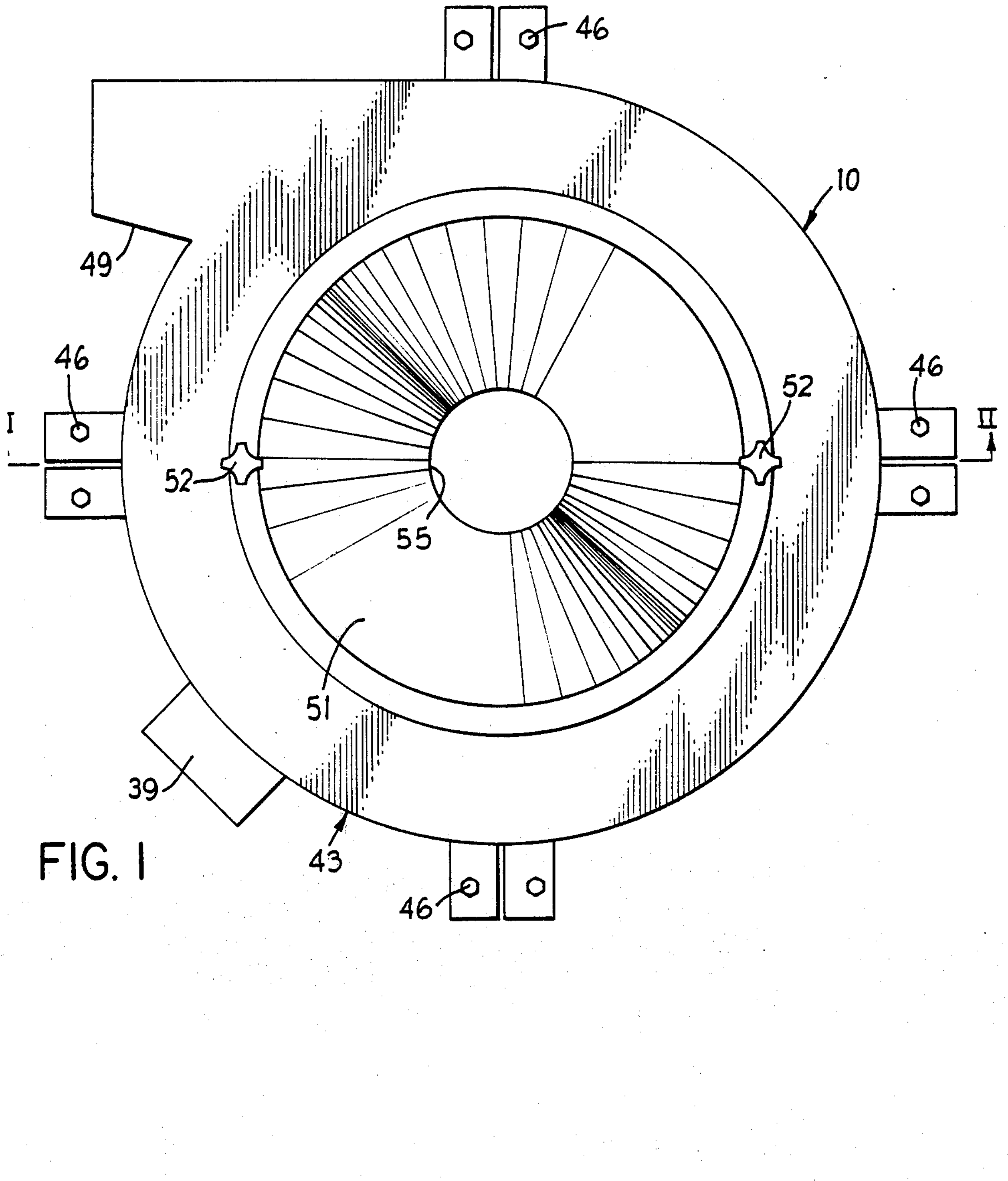
FIG. 1 is a top view of a centrifuge embodying the invention.
Figure 2:
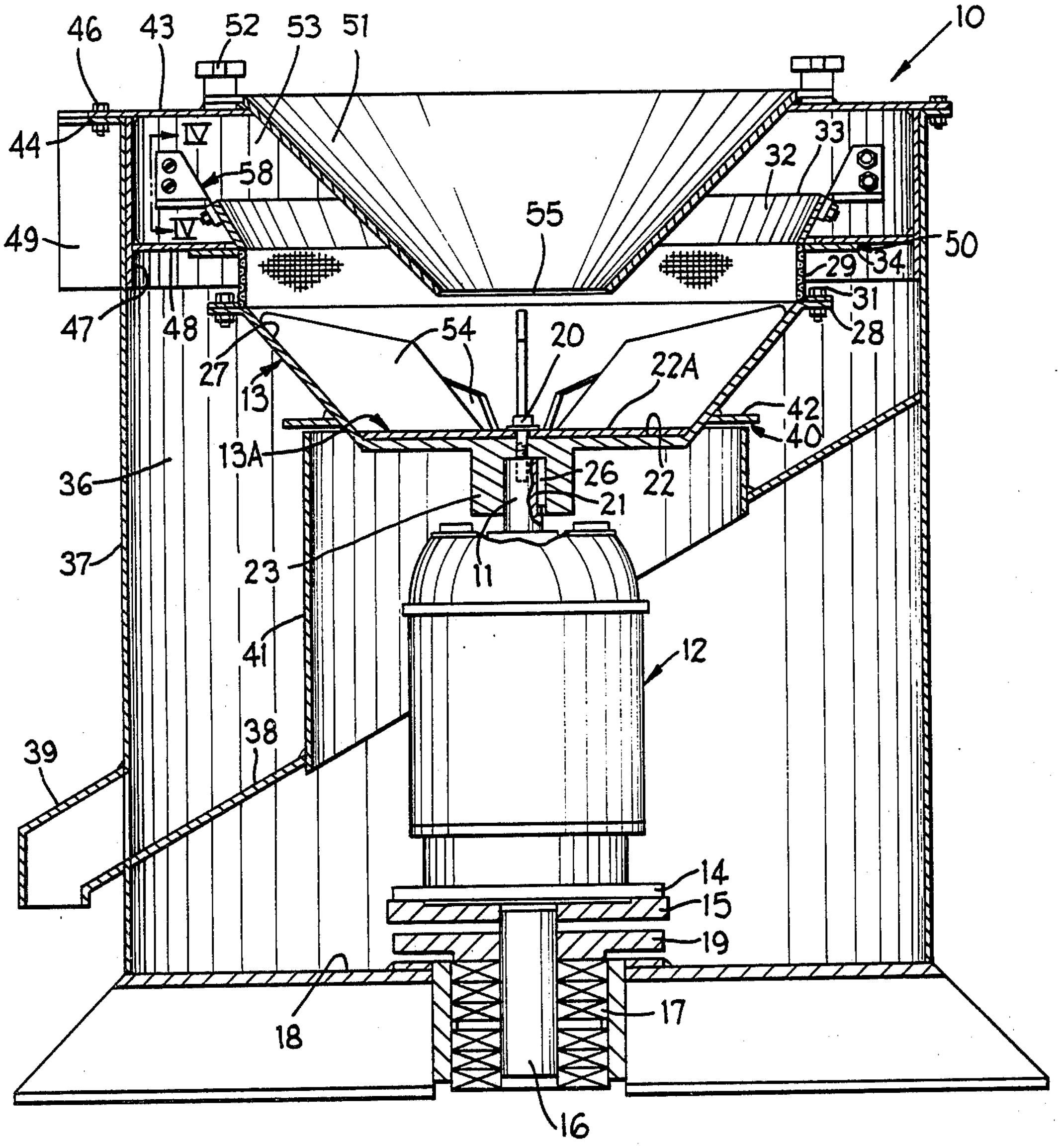
FIG. 2 is a sectional view taken along the line II—II of FIG. 1.

Certain terminology will be used in the following description for convenience in reference only and will not be limiting. The words "up" and "down" will designate directions in the drawings to which reference is made. The words "in" and "out" will refer to directions toward and away from, respectively, the geometric center of the device and designated parts thereof. The aforementioned terminology will also include derivatives thereof and words of similar import.

DETAILED DESCRIPTION

Referring now to the drawings, it will be seen that the centrifuge 10, according to the present invention, comprises a motor 12 having a substantially vertical drive shaft 11 to the upper end of which a substantially bell-shaped centrifugal separator bowl 13 is connected for rotation with the drive shaft. Elastic mounting means are provided for mounting the motor with the drive shaft extending in substantially vertical direction and permitting the motor to vibrate transverse to its axis. The elastic mounting means may include a flange 14 secured to the lower end of the motor 12, a second flange 15 abutting against the flange 14 coaxially arranged with respect thereto and fixed thereto in any convenient manner and carrying fixably connected thereto a downwardly projecting central stud shaft 16 surrounded by a plurality of rubber rings 17 which are housed in a socket mounted in the base 18 of the centrifuge 10. The rubber rings 17 can be compressed by means of a clamping flange 19 screwed into the upper end of the socket in which the rubber rings are housed.

The end of the drive shaft 11 projecting upwardly beyond the motor 12 is preferably keyed. An internally keyed recess 21 is located in a central cavity in the bottom wall 22 of the separator bowl 13 and receives the keyed shaft 11 so as to effect a driving coupling between the shaft 11 and the separator bowl 13. In this particular embodiment, the central cavity in the bottom wall 22 of the separator bowl 13 is defined by a hub member 23. A key 26 is received in the keyway and cooperates with the corresponding keyed recess 21 in the hub 23 to effect the unitary drive between the drive shaft 11 and the separator bowl 13. The bottom wall of the separator bowl extends outwardly and upwardly to form an upwardly opening conical surface 27. A flange 28 extends radially outwardly of the upper edge of the conical surface 27. A bottom wall liner 13A is mounted in the separator bowl 13 and is removably secured by a centrally disposed bolt 20 to an internally-threaded hole in the end of the shaft 11. The bottom wall liner 13A has a generally flat plate 59 with a central opening 61 therethrough. In this particular embodiment, the bottom wall 22 of the separator bowl 13 is also flat so that the plate 59 essentially covers the entirety of the bottom wall 22. A plurality of blade members 54 are secured, as by welding, to the upper surface of the plate 59. The blade members 54 are radially oriented with respect to the separator bowl 13 and are angularly spaced on the plate about the central hole 61. The radially outer edge 62 is beveled so that it conforms to the angle of the internal wall surface 27 of the separator bowl 13. In addition, the blades have alternating variations in height to assure the bringing up to speed of all metal shavings deposited into the separator bowl and to keep the shavings from bouncing in the bowl and out of the top without being centrifuged. A substantially cylindrical and porous separator bowl portion 29 defined by a wire mesh or the like, namely a portion having openings therein to permit passage of lubricant therethrough without permitting passage of shavings, extends upwardly from the flange 28 to permit a discharge of the lubricating liquid to be separated from the metal shavings in the separator bowl from the interior of the latter. The porous cylindrical portion 29 is secured to the flange 28 by means of a plurality of fasteners 31. A conical portion 32 is secured to the upper edge of the porous portion 29 and extends radially outwardly in an upward direction to a shaving dispensing edge 33 thereon. A radially extending flange 34 is secured to the centrifugal separator bowl 13 intermediate the juncture between the conical portion 32 and the porous cylindrical portion 29 and extends radially outwardly therefrom. The purpose of this flange will be explained hereinbelow.

The liquid discharged through the openings in the porous separator bowl portion 29 will be collected in a collection chamber 36, preferably constituted by a casing wall 37 surrounding the separator bowl outwardly spaced therefrom and provided with a bottom 38 which is slightly inclined toward a discharge conduit 39 communicating with the interior of the chamber 36. An annular flange 42 is secured to and extends radially outwardly from the conical portion 27 of the separator bowl 13 at a location thereon immediately above the upper edge of the cylindrical portion 41 to define a labyrinth type seal 40 to prevent the movement of particles and/or lubricant into the interior of the cylindrical portion 41 adjacent the motor 12.

A cover 43 is fixed in any convenient manner to the upper edge of the casing wall 37. In this particular embodiment, the upper edge of the casing wall 37 has a radially outwardly extending flange 44 thereon having a plurality of holes therein receiving fasteners 46 cooperating with aligned holes in the cover 43 to effect the securement of the cover 43 to the casing 37. The cover 43 is designed so as to be interchangeable with existing centrifuge structures. The cover has a downwardly extending wall, cylindrical wall 47, telescoped inside the upper edge portion of the casing 37. A radially inwardly directed flange 48 is secured to the cylindrical wall member 47 and is positioned so as to be located immediately above the radially outwardly extending flange 34 secured to the separator bowl 13 at the juncture between the porous separator bowl portion 29 and the conical portion 32. The spacing between the flanges 34 and 48 define a labyrinth type seal 50 to prevent the movement of chips into the chamber 36. The radially inner edge of the flange 48 is spaced radially outwardly from the conical portion 32 of the separator bowl 13 to facilitate an oscillatory movement of the separator bowl 13 should it become lopsided in its loaded condition. As illustrated in FIG. 1, the cover 43 is generally circular in construction and has an outlet duct integrally formed therewith. In this particular embodiment, the cover 43 has an upper conical member 51 releasably secured thereto by a plurality of fasteners 52 so that the wall of the cone 51 defines the inner wall of a second annular shaving collecting chamber 53 and the cylindrical wall 47 defines the outer wall thereof. The upper cone 51 converges in a downwardly direction to a location spaced immediately above the plane defined by the radial flange 28 at the upper end of the conical portion 27 of the separator bowl 13. The opening 55 at the lower end of the upper cone 51 defines an air inlet as well as an inlet for shavings into the centrifuge 10.

A second set of blades 58 is secured to the conical portion 32 adjacent the upper terminal edge 33 thereof in a way disclosed in U.S. Pat. No. 4,137,176, filed Oct. 11, 1977, and further detailed discussion is believed unnecessary.

OPERATION

Although the operation of the device embodying the invention has been indicated somewhat above, the operation will be described in detail hereinbelow for convenience purposes and to facilitate a more complete understanding of the invention.

As metal shavings impregnated with lubrication enter the cone 51 and the separator bowl 13 through the lower conical opening 55, the lubrication-impregnated shavings will fall between the blade structure 54 and a rotation of the separator bowl 13 will impart a rotational movement of the shavings. The shavings, as they gain rotational velocity, will begin to slide radially outwardly and up the conical surface 27 toward the porous cylindrical separator bowl portion 29. As the shavings slide across the porous separator bowl portion 29, lubrication contained on the shavings will be thrown radially outwardly through the holes therein and be collected in the chamber 36 for discharge through the outlet conduit 39. The chips will continue to move upwardly and radially outwardly on the conical surface 32 and be thrown radially outwardly and tangentially from the terminal edge 33 at the upper edge of the separator bowl 13. The blades 58 will effect an air movement within the chamber 53 and the shavings entering the chamber 53 will be entrained in the aforesaid air movement. Air will be drawn into the chamber 53 through the material inlet opening 55 in the cone 51. The air will be blown out through the outlet duct 49 and the shavings will be carried in entrainment therewith out through the outlet duct 49 toward any designated destination or by means of simple diverters to any one of several locations.

As indicated above, amongst the metal chips and shavings, which are to be centrifuged to extract the lubricating oil thereon, there are numerous rod ends, tool bits, workpieces and scrap pieces of metal. The phrase "rod ends" is a term of art meaning the end of elongated metal rods which the machine operator simply tosses into the collection of metal chips at the end of the rod being machined. In addition, the machine operator may want to dispose of scrap wherein machining mistakes have been made on workpieces. As a result, rather large pieces of metal can be found in a collection of metal shavings. An engagement by the blades 54 with the rod ends, tool bits, workpieces and scrap pieces of metal, or the like, will cause a substantial jolt or shock to be applied to the blades 54. While the central bolt 20 received in the central hole 61 effectively urges the plate 59 into tight frictional engagement with the bottom wall 22 of the separator bowl so that the plate 59 and blades 54 will be effectively moved with the separator bowl 13, the shock applied to the blades 54 by these large objects will be sufficient to incrementally move or index the plate 59 relative to the separator bowl 13. As a result, the leading surface of each of the blades adjacent the radially outermost portion thereof becomes located adjacent an unworn segment of the internal wall surface of the separator bowl. As a result, wear to the internal wall surface of the separator bowl is substantially minimized by the foregoing structure.

On the other hand, and if there should be no large objects within the metal shavings, the machine operator can, from time to time, simply take a hammer or other tool and strike the blades 54 to effect the aforesaid indexing of the plate 59 and blades 54 relative to the separator bowl 13. Thus, the lifetime of the separator bowl can be substantially enhanced through the automated procedure wherein the blades 54 come into engagement with large objects embodied within the collection of metal shavings or through a manual changing of the orientation of the plate 59 and blades 54 relative to the separator bowl 13.

ALTERNATE CONSTRUCTION

FIGS. 5 and 6 illustrate a modified blade 54A mounted on the plate 59. In this particular embodiment, a pair of holes 63 are provided in the plate 54A. A radially shiftable plate 64, having a pair of elongated slots 66 therein, is provided on the trailing side of the blade 54A. The elongated slots 66 extend radially and generally parallel to the upper surface of the plate 59. The slots 66 are axially aligned with the holes 63 in the blade 54A and bolts 67 extend through the axially aligned holes. A nut 68 is threadedly engaged with the threaded end of each of the bolts 67 so that the shiftable plate 64 is loosely clamped between the nuts 68 and the trailing surface of the blade 54A. As a result, when the separator bowl 13 is rotated at a high velocity, centrifugal force will urge the shiftable plate 64 radially outwardly and into engagement with the internal wall surface of the separator bowl 13 to function as a wiper plate. The radially outermost edge 69 of the shiftable plate 64 has a contour which corresponds to the contour of the internal wall surface of the separator bowl 13.

FIGS. 7 and 8 illustrate a further modified blade construction 54B mounted on the plate 59. In this particular embodiment, a shoe 71 is weldably secured to the radially outermost segment of the leading surface 72 of the blade 54B and to the radially outermost portion of the plate 59. The shoe 71 has a finite width so that the leading edge 73 thereof is spaced ahead of the leading surface 72 of the blade 54. The purpose of this construction is to minimize the engagement of metal shavings with the internal wall surface of the separator bowl adjacent the juncture between the bottom wall 22 and the conical internal wall surface 27. Referring to FIG. 7, for example, the metal shavings will be engaged by the leading surface 72 of the blade 54B and travel in a direction schematically illustrated by the several arrows A in FIG. 7. A top view of the arrows A is illustrated in FIG. 8. It is clearly evident that the metal shavings will travel along the radially inwardly facing surface 74 of the shoe 71 rather than along the internal wall surface of the separator bowl 13.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A centrifuge for continuously separating a lubricating liquid from lubrication-impregnated metal shavings or the like, comprising:
- a motor having a rotatable drive shaft;
- substantially bell-shaped centrifugal separator bowl means having a shaving dispensing edge and openings for the discharge of liquid therethrough;
- power transmission means for transmitting rotatable output from said drive shaft to said separator bowl means; and
- wear resistant liner means in the bottom of said separator bowl means and having a plurality of angularly spaced blade means thereon, said liner means including a partial wall means adjacent the leading side of said blade means, the leading edge of which is angularly spaced from the trailing side of the next of said blade means, for guiding the movement of said metal shavings thereover adjacent the radially outer edge thereof to protect said separator bowl means from wear; and support means for supporting said wear resistant liner means for rotatable movement relative to said separator bowl means.

2. A centrifuge according to claim 1, wherein said liner means includes a plate lining said bottom of said separator bowl means and releasable connecting means for connecting said liner means to said separator bowl means.

3. A centrifuge according to claim 2, wherein said partial wall means includes a wear shoe secured to the leading side of said blade means adjacent the radially outer extremity thereof and said plate adjacent the outer extremity thereof.

* * * * *